(12) United States Patent
Cardani et al.

(10) Patent No.: US 9,045,182 B2
(45) Date of Patent: Jun. 2, 2015

(54) PLANT FOR ASSEMBLING MECHANICAL PARTS ON BODIES OF MOTOR-VEHICLES

(75) Inventors: Sergio Cardani, Ponticnino (IT); Guido Rumiano, Ponticnino (IT); Angelo Putiri, Ponticnino (IT)

(73) Assignee: Comau S.p.A., Grugliasco (Torino) (IT)

( * ) Notice: Subject to any disclaimer, the term of this patent is extended or adjusted under 35 U.S.C. 154(b) by 292 days.

(21) Appl. No.: 12/973,265

(22) Filed: Dec. 20, 2010

(65) Prior Publication Data

US 2011/0154654 A1  Jun. 30, 2011

(30) Foreign Application Priority Data

Dec. 30, 2009 (IT) .............................. TO2009A1054

(51) Int. Cl.
| | | |
|---|---|---|
| *B62D 65/02* | (2006.01) | |
| *B62D 65/18* | (2006.01) | |
| *B23P 19/06* | (2006.01) | |
| *B62D 65/12* | (2006.01) | |

(52) U.S. Cl.
CPC ................. *B62D 65/18* (2013.01); *B23P 19/06* (2013.01); *B23P 2700/50* (2013.01); *B62D 65/12* (2013.01)

(58) Field of Classification Search
CPC .... B23P 21/004; B23P 2700/50; B23P 19/04; B23P 21/00; B62D 65/02; B62D 65/18
USPC .......... 29/428, 430, 783, 784, 786, 791, 793, 29/794, 799, 824
See application file for complete search history.

(56) References Cited

U.S. PATENT DOCUMENTS

| | | | | | |
|---|---|---|---|---|---|
| 2,804,962 | A | * | 9/1957 | Sherman .................... | 198/346.2 |
| 3,968,559 | A | * | 7/1976 | Karlsson ......................... | 29/430 |
| 5,397,047 | A | * | 3/1995 | Zampini ........................ | 228/6.1 |
| 6,109,424 | A | * | 8/2000 | Doan .......................... | 198/468.8 |
| 6,145,180 | A | * | 11/2000 | Kogai et al. ..................... | 29/429 |
| 6,494,304 | B1 | * | 12/2002 | Jaynes et al. ............... | 198/345.2 |

(Continued)

FOREIGN PATENT DOCUMENTS

| | | |
|---|---|---|
| DE | 297 21 038 U1 | 5/1999 |
| EP | 0 751 161 A1 | 5/1999 |

(Continued)

OTHER PUBLICATIONS

Italian Search Report, Dated Aug. 9, 2010.

*Primary Examiner* — Alexander P Taousakis
*Assistant Examiner* — Lee A Holly
(74) *Attorney, Agent, or Firm* — Young Basile Hanlon & MacFarlane P.C.

(57) ABSTRACT

A plant for assembling mechanical parts on bodies of motor-vehicles comprises an endless conveying line and a plurality of pallets movable along the conveying line, each receiving mechanical parts of the motor-vehicle along a first section of the line. Means for loading a respective motor-vehicle body on a respective pallet at a loading station, located at the beginning of a second section of the conveying line, downstream of the abovementioned first section with reference direction of movement of the pallets are provided. At least one bolting station for bolting the mechanical parts on the respective body along the abovementioned second section is provided. The abovementioned second section of the line is superimposed to the first section and aligned therewith, so that the pallets move along a closed loop in a vertical plane, moving along the upper section in a direction opposite to their direction of movement along the lower section.

20 Claims, 15 Drawing Sheets

(56) References Cited

U.S. PATENT DOCUMENTS

| | | |
|---|---|---|
| 6,554,119 B2 * | 4/2003 | Oldford et al. ............. 198/345.3 |
| 6,835,909 B2 * | 12/2004 | Nakamura et al. ........... 219/86.7 |
| 6,966,427 B2 | 11/2005 | Kilibarda |
| 6,991,087 B2 * | 1/2006 | Krannich et al. .......... 198/465.1 |
| 7,232,027 B2 | 6/2007 | Kilibarda |
| 7,469,473 B2 * | 12/2008 | Savoy .......................... 29/897.2 |
| 2004/0195077 A1 | 10/2004 | Kilibarda |
| 2005/0241915 A1 | 11/2005 | Kilibarda |
| 2006/0167587 A1 * | 7/2006 | Read ............................. 700/245 |
| 2010/0263801 A1 * | 10/2010 | Lawson et al. ................. 157/1.1 |

FOREIGN PATENT DOCUMENTS

| | | | |
|---|---|---|---|
| EP | 1 612 183 A1 | 1/2006 | |
| GB | 2 136 330 A | 9/1984 | |
| GB | 2136330 A * | 9/1984 | ............. B23P 19/00 |
| WO | 2005/005290 A2 | 1/2005 | |

* cited by examiner

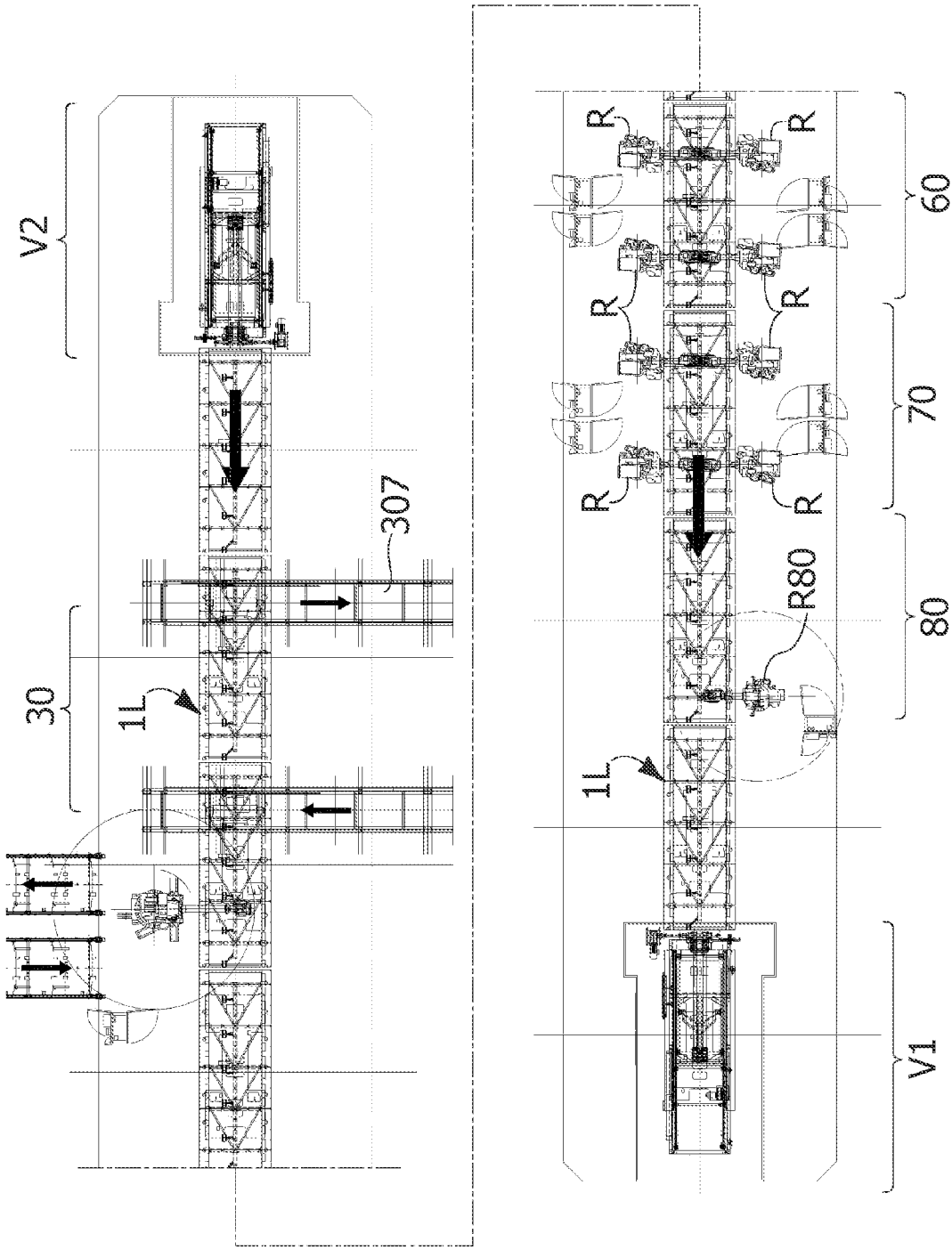

PLANT FOR ASSEMBLING MECHANICAL PARTS ON BODIES OF MOTOR-VEHICLES

FIELD OF THE INVENTION

The present invention relates to relates to a plant for assembling mechanical parts on bodies of motor-vehicles.

BACKGROUND

Plants are known (see for example document GB 2 136 330) comprising:

an endless conveying line, a plurality of pallets movable along the conveying line, each receiving a number of mechanical parts of the motor-vehicle along a first section of the conveying line, means for loading a respective motor-vehicle body on a respective pallet at a loading station, located at the beginning of a second section of the conveying line, downstream of said first section with reference to the direction of movement of the pallets, at least one bolting station arranged in said second section of the conveying line and provided with means for bolting said mechanical parts to said body, and means for unloading the respective body with the mechanical parts bolted thereon at the end of said second section of the conveying line.

In the above mentioned solution known from the aforementioned prior art document, the first and the second section of the line are part of an endless path arranged in a horizontal plane and they extend according to two directions parallel and spaced with respect to each other. At the ends thereof, the two parallel sections of the line are connected to each other by conveying lines directed transversely with respect thereto. The plants of this type have the drawback of occupying a relatively extensive space within the assembly plant. A further drawback lies in the fact that the abovementioned connection transverse sections, though occupying useful space in the plant, are entirely passive, in the sense that no operation useful within the assembly cycle is carried out there along. A further serious drawback lies in the fact that access to the useful sections of the line from the side facing inwards the endless path is difficult, hence the logistic management of the plant is complicated, especially regarding supplying parts to the various stations of the line.

BRIEF SUMMARY

With the aim of overcoming all the above-mentioned drawbacks, the present invention has the object of providing a plant of the previously indicated type, which is also characterized in that:

said second section of the conveying line is superimposed and spaced apart above the abovementioned first section and aligned therewith, so that the pallets move along an endless path arranged in a vertical plane, said pallets being moved along said upper second portion in a direction opposite to their direction of movement along said lower first section, said plant comprises a lifting station for lifting a respective pallet from the end of the lower first section at the beginning of the upper second portion, and lowering station for lowering a respective pallet from the end of the upper second portion to the beginning of said lower first section, and said bolting means are provided along said lower first section of the line, below said at least one bolting station provided along said second section, for bolting said mechanical parts to the respective motor-vehicle body.

The main advantage of the plant according to the invention lies in the fact that it occupies—horizontally—a considerably smaller space with respect to that of the plants provided according to the previously described prior art and it however does not occupy space with passive line sections, in which no operation part of the assembly cycle is carried out. Furthermore, each station of the line is free and easily accessible from both sides thereof, hence considerably simplifying the supply logistics with respect to the prior art. Lastly, given that the bolting station is at an elevated position, the bolting means, whether robots or tools controlled manually by operators, can be provided at the lower level, without requiring excavation of pits into the floor as it inevitably occurs in the case of the prior art.

According to a further preferred characteristic, each of the pallets used in the plant according to the invention is provided with reference means for positioning thereon mechanical parts to be bolted to a respective body, said reference means being adaptable to different types of motor-vehicles. Still in the case of the preferred embodiment, at least part of said reference means for positioning mechanical parts are carried by one or more sub-pallets mounted on a base element of said pallet. Different types of sub-pallets are provided for different types of motor-vehicles.

Due to the abovementioned characteristics, the plant according to the invention has a high degree of operative flexibility, given that it is adaptable to operate on different types of motor-vehicles (for example both on cars and on vans or light tracks) and/or on different models of motor-vehicles (for example different car models) and/or on different versions of the same model (for example on the sedan version, on the station-wagon version and on the cabriolet version). At the same time, the provision of the abovementioned sub-pallets allows pre-mounting thereon, off-line, the mechanical parts and then mounting said parts on the pallet along the line, through a single and quick operation.

The plant according to the invention is suitable to be easily adapted both according to a configuration in which the bolting means comprise manually controllable bolting devices and according to a configuration in which the bolting means comprise bolting devices carried by programmable manipulating robots.

According to a further preferred characteristic, the abovementioned pallets are provided, in a manner per se known from the previously mentioned GB 2 136 330 A, with one or more vertical transmission shafts freely rotatable on the pallet and passing through the pallet, each of said shafts having a lower end engageable by said bolting devices and an upper end bearing a screw for bolting a respective mechanical part to a respective body.

In general, the means forming the line for conveying the pallets and in particular the means per moving the pallets along the line, as well as the means for controlling the precise positioning of each pallet at each station of the line, as well as the means for vertically moving the pallets at the beginning and at the end of the lower section and the upper section of the line, can be of any known type. However, in a particularly preferred embodiment, the conveying line is a motorized roller line provided with the devices sold by the Applicants under the "VERSADRIVE" and "VERSACODER" trademarks. Furthermore, in such embodiment, the plant according to the invention is preferably provided with an automatic vision system of the type sold by the Applicant under the "VERSAVISION" trademark, which compares the image obtained by means of a camera with a reference image memorized in the device. The abovementioned devices were also an object of the patents filed by the Unites States subsidiary company of the APPLICANT (see for example WO2005005290, U.S. Pat. No. 6,966,427, U.S. Pat. No. 7,232,027).

BRIEF DESCRIPTION OF THE DRAWINGS

Further characteristics and advantages of the invention shall be clear from the description that follows with reference to the attached drawings, purely provided by way of non-limiting example, wherein.

DETAILED DESCRIPTION OF EMBODIMENTS

Figure 1:
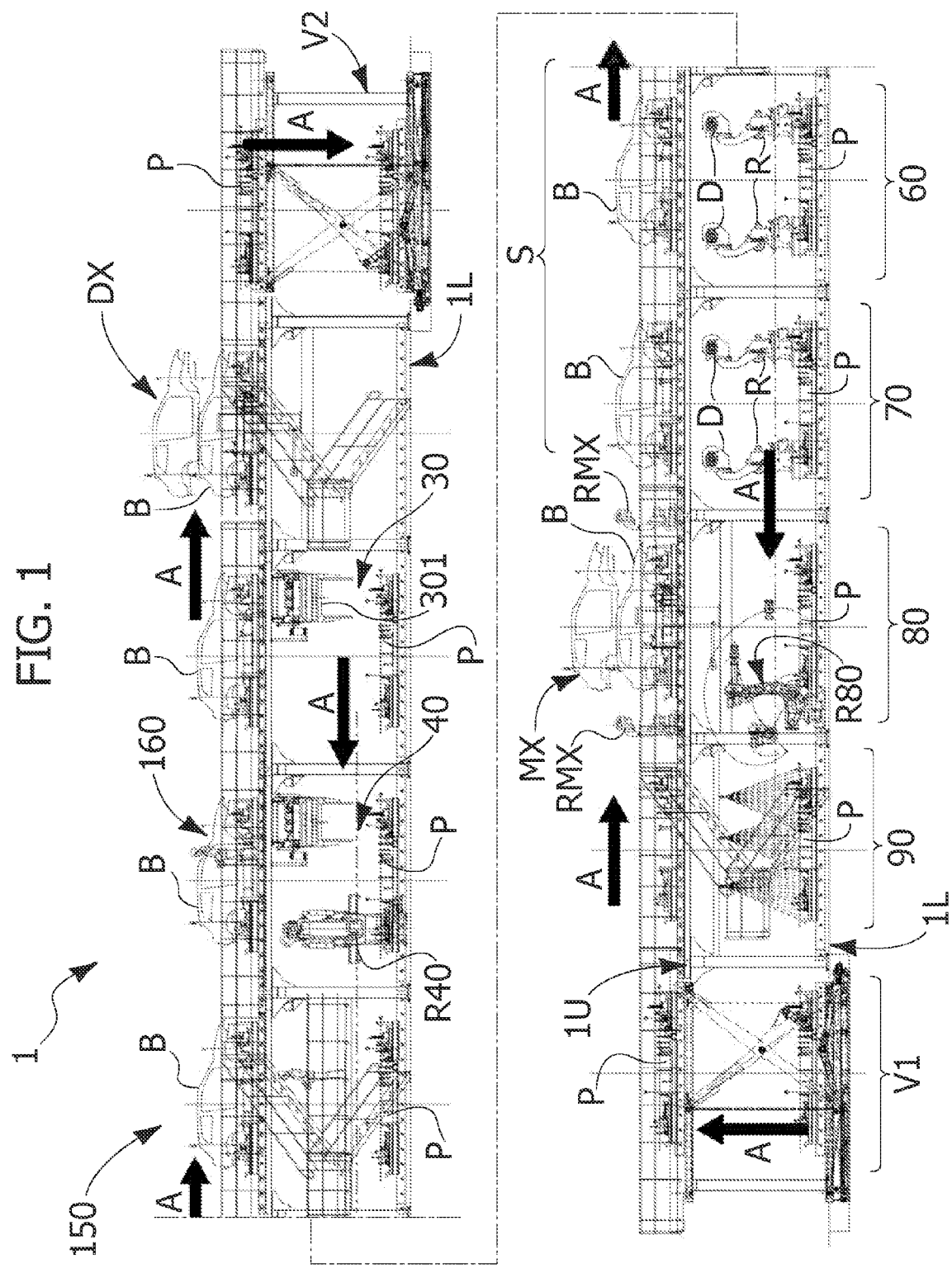
FIG. 1 is a side elevational view of a preferred embodiment of the plant according to the invention.
Figure 2A:
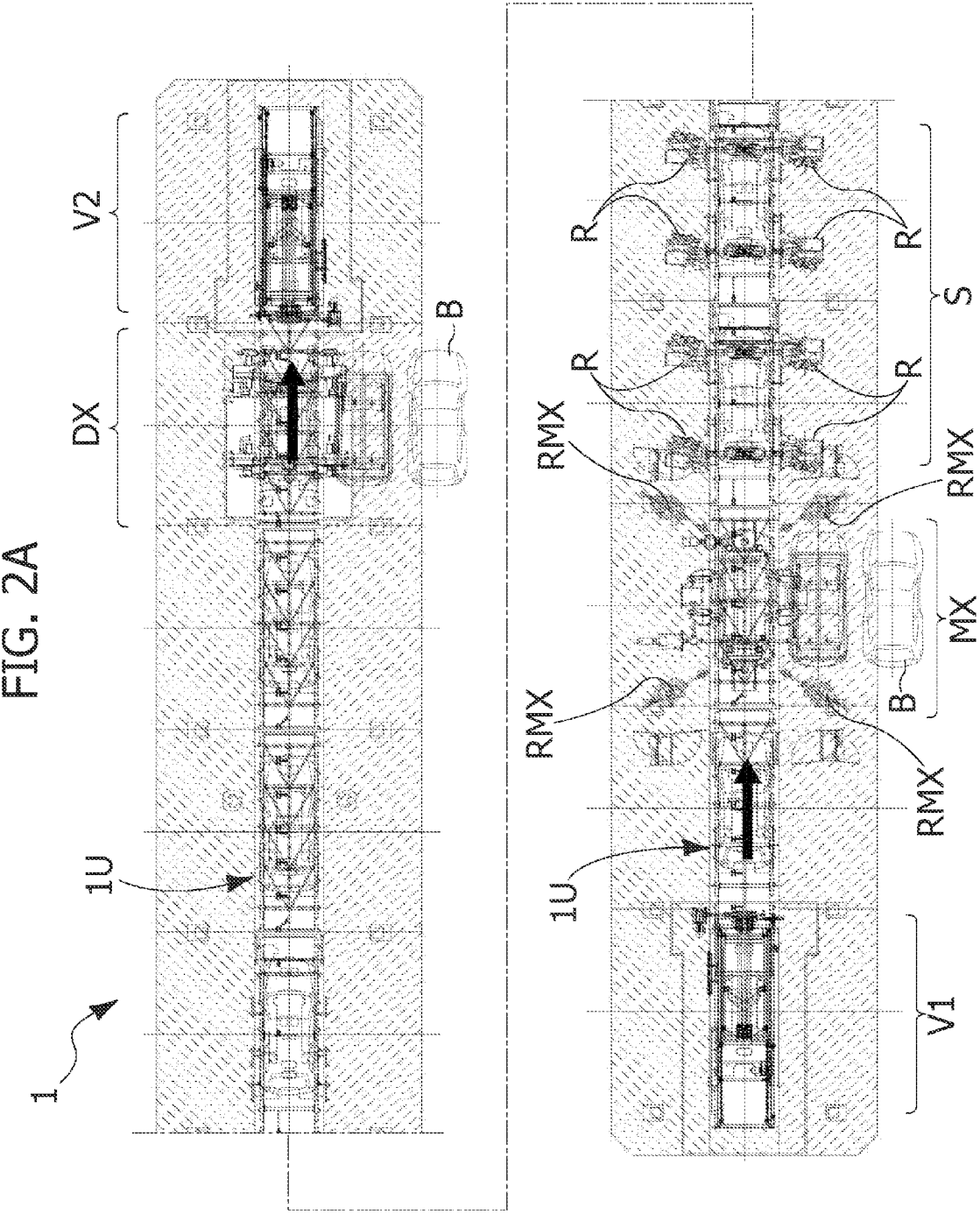
FIG. 2 is a plan view of the plant of FIG. 1.

In FIGS. 1 and 2, a plant for assembling motor-vehicles is indicated in its entirety with reference number 1. The plant 1 comprises a conveying line which follows an endless path in a vertical plane, with a lower section, indicated in its entirety with reference number 1L, along which pallets P are conveyed in succession in a first direction (from right to left with reference to the drawings) and an upper section, indicated in its entirety with 1U superimposed at a suitable distance on the lower section 1L and aligned in the same direction. Along the upper section 1U, the pallets P move in a direction opposite to the direction of movement of the pallets along the lower section 1L (i.e. from left to right with reference to the drawings). The direction of the movement of the pallets in the plant 1 is indicated by the arrows A in FIG. 1.

A vertical transfer station V1 with a lifting device which lifts a respective pallet P from the lower section 1L to the upper section 1U is provided at the final end of the lower section 1L of the conveying line. Analogously, a vertical transfer station V2 with a lifting device capable of lowering a respective pallet P from the upper section 1U to the lower section 1L is provided at the final end of the upper section 1U.

As illustrated in detail hereinafter, along the lower section 1L an initially empty pallet P progressively receives the mechanical parts intended to be assembled on a respective motor-vehicle body.

The term "mechanical parts" is used in the present description and in the claims that follow to indicate both the engine of the motor-vehicle as well as any other mechanical part intended to be assembled on the body of the motor-vehicle, such as in particular the front and rear suspension elements, including the springs and the shock absorbers, as well as the transmission components associated to the engine unit.

At the end of the lower section 1L of the line a respective pallet P with all the mechanical parts mounted thereon is transferred in the station V1 to the upper section 1U, before being moved to a station MX of the upper section where the association (or "marriage") of a respective body B with the various mechanical parts mounted on the pallet is carried out.

A bolting station S—at which the mechanical parts carried by the pallet are bolted on the respective body B using bolting means D which are provided along the lower section 1L, along the upper section 1U of the line—is provided below the bolting station S. In the example illustrated in FIG. 1 the bolting means are electric bolting devices carried by manipulating robots R, though it is possible, as observable, to provide for that such bolting be carried out—through manually controlled electric bolting devices—by operators positioned along the lower section 1L of the line, below the station S.

A station DX in which the separation (or "divorce") of a respective body B, with the mechanical parts bolted thereon, from a respective pallet P is provided in the final portion of the upper section 1U of the line, immediately before the vertical transfer station V2. The pallet P thus unloaded reaches the vertical transfer station V2 through which it is lowered to the level of the lower section 1L, where it is ready again to receive the mechanical parts intended to be bolted on a new body.

The plant illustrated in FIGS. 1, 2 is provided to have a high operative flexibility, given that it is capable of simultaneously operating on different types and/or different models and/or versions of motor-vehicles. First and foremost, this is achieved by providing a modular architecture for each pallet P, hence allowing easily and quickly adapting each pallet to receive the mechanical parts of the different types of motor-vehicles on which the line is to operate.

Figure 3:
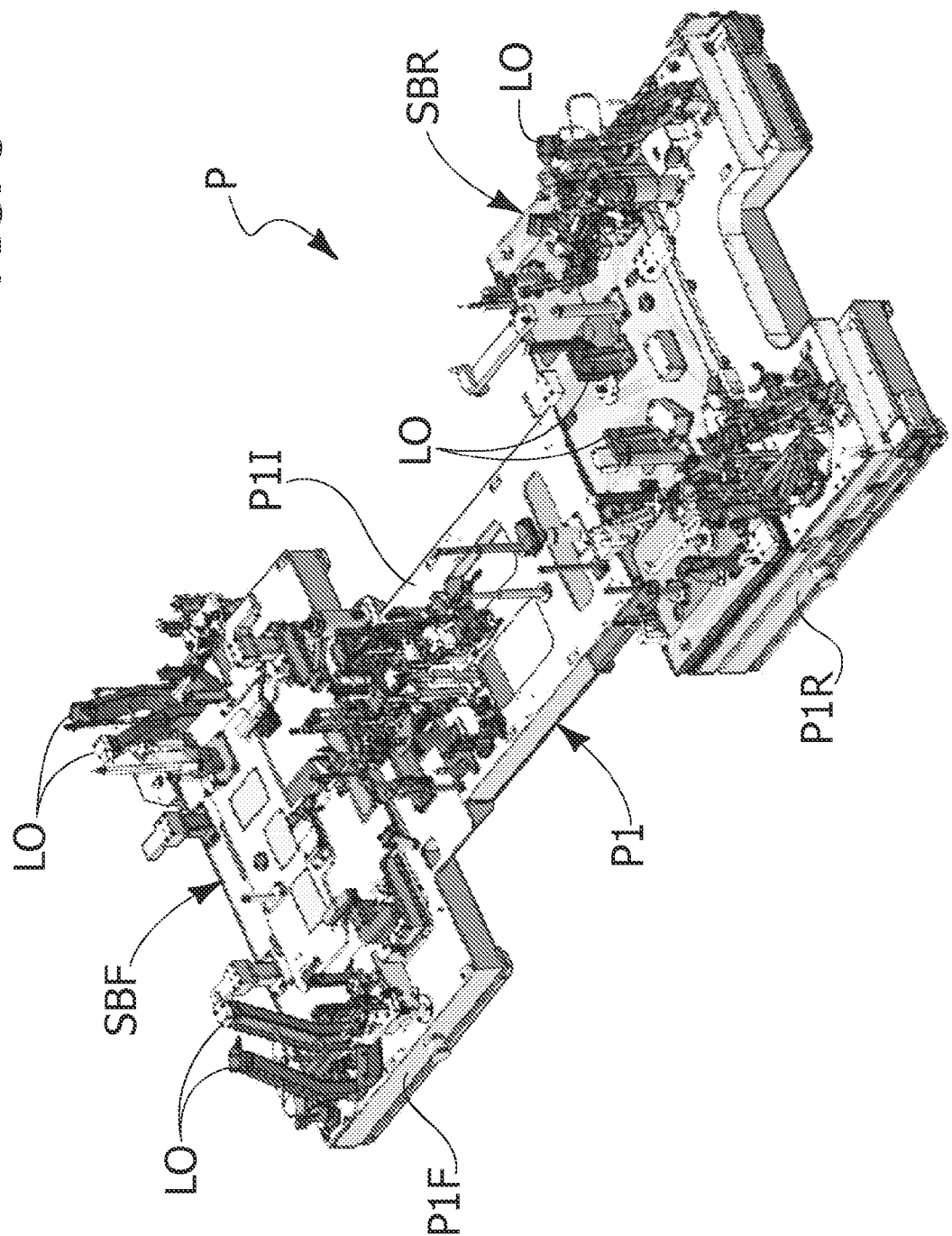
FIG. 3 is a perspective view of an example of a pallet used in the plant according to the invention.

FIG. 3 shows a preferred embodiment for the modular architecture of each pallet P. According to such solution, a main pallet element P1—formed by a base platform in form of a metal framework, or having a front portion P1F and a rear portion P1R connected to each other by a narrower intermediate portion P1I—is provided. The pallet structure P further comprises a front sub-pallet SBF and a rear sub-pallet SBR which are coupled and fixed to the base element P1 at the portions P1F and P1R thereof. Both the sub-pallets SBF,SBR and the intermediate portions P1I of the base element P1 are provided with a plurality of reference supports LO used for the supporting and locating—in the proper assembly position—a plurality of mechanical parts, particularly among which the engine, the front and rear suspension elements and the transmission components of a motor-vehicle.

Due to the previously described modular architecture of each pallet P, the plant 1 according to the invention can be easily adapted to operate on different types or models or versions of motor-vehicles. The main base element P1 of the pallet P is adapted to receive a plurality of different types of front and rear sub-pallets in turn adapted to respective types of motor-vehicles. Each of the abovementioned sub-pallets SBF,SBR can in turn be provided both with reference supports LO corresponding to a given type of motor-vehicle and with supports corresponding to another type. In particular, each sub-pallet SBF is used for loading thereon the front suspension of a corresponding type of motor-vehicle and different types of engines, while the sub-pallet SBR is used for loading different types of rear suspensions. The versatility of each sub-pallet in combination with the provision of different types of sub-pallets quickly interchangeable with respect to each other allows obtaining high production flexibility, allowing the use of the plant 1 for the simultaneous production of a plurality of different types/models/versions of motor-vehicles. The further great advantage of providing the sub-pallets lies in the fact that the mechanical parts can be pre-mounted thereon off-line, then the mounting on the base element P1 is carried out with a single and quick operation for each of said sub-pallets.

Still with reference to FIG. 3, the pallet P is preferably provided, both at the intermediate portion P1I of the base element P1 and at the sub-pallets SBF, SBR, with vertical shafts freely rotatable on the pallet (not illustrated), which serve as transmission shafts, which allow bolting various mechanical parts to a respective body by engaging the bolting devices onto the end of said rotatable shafts which project below the pallet. Such solution is per se known from the previous patent GB 2 136 330 A of the same Applicant.

The means which drive and control the forward movement of the pallets P along the lower section and the upper section 1L, 1U of the line can be obtained in any known manner, but preferably they comprise a line of powered rollers, preferably of the type forming an object of the united states patent U.S. Pat. No. 6,966,427, U.S. Pat. No. 7,232,027 owned by the subsidiary company of the Applicant. Still preferably, the forward movement and the precise positioning of the pallets P along the line is obtained by means of devices sold under the "VERSADRIVE" and "VERSACODER" trademarks by the Applicant (see also WO2005005290).

FIGS. 4-13 of the attached drawings show more in detail and in enlarged scale the main stations of the plant 1 of FIGS. 1, 2.

Figure 4:
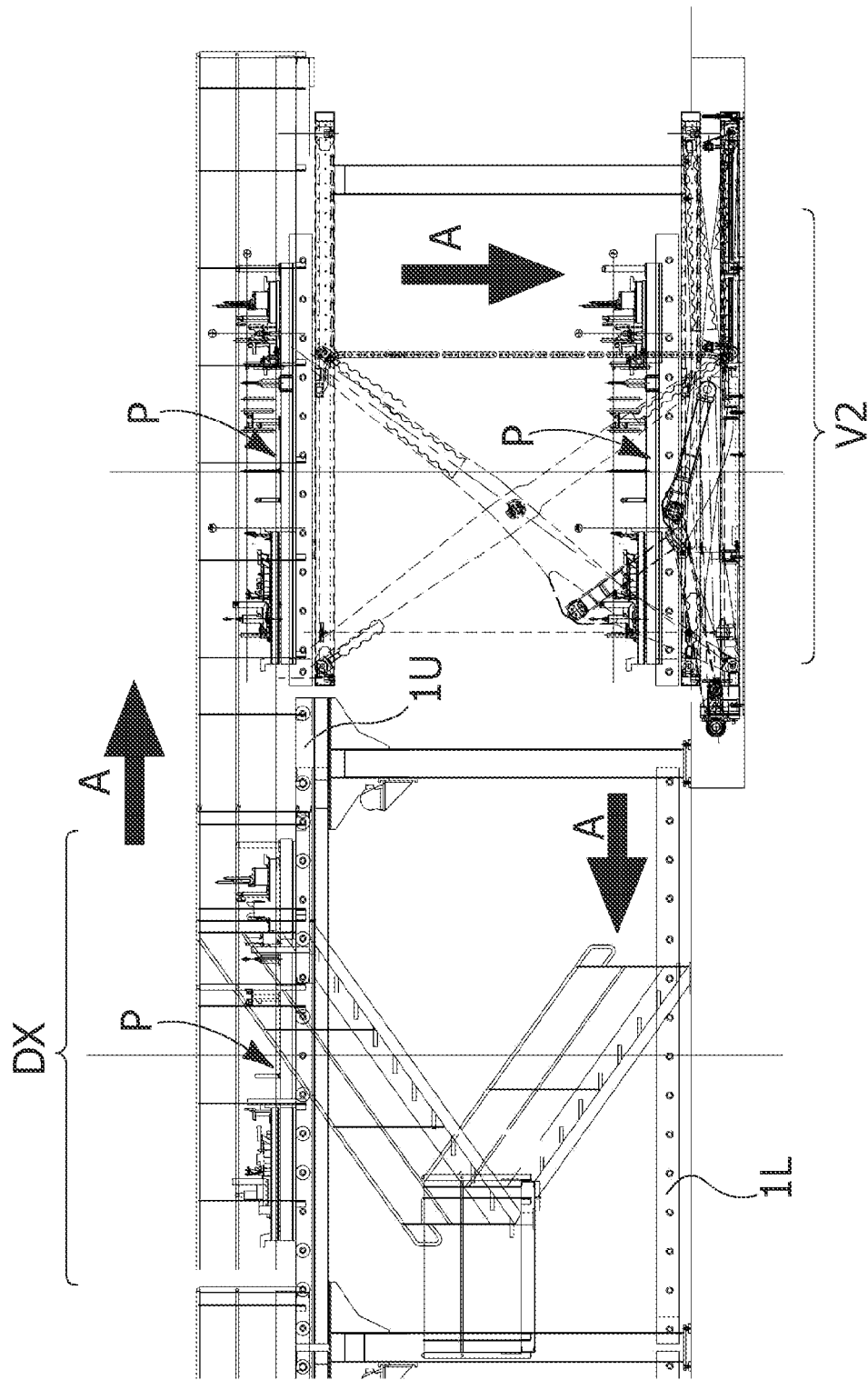
FIG. 4 is a side elevational view showing the station for the vertical transfer of pallets which connects the final end of the upper section of the line to the initial end of the lower section of the line.

FIG. 4 illustrates the detail of the vertical transfer station V2 through which a respective pallet P can be lowered from the level of the upper section 1U to the level of the lower section 1L. The transfer device for the vertical movement of the pallet at the transfer station V2 can be of any known type, but in the illustrated case it is specifically of the type forming an object of the European patent EP 1 612 183 B1 of the Applicant, which provides an X-shaped pantograph controlled by a belt winch system. The construction details of such device are not illustrated further in FIG. 4, both for the sake of rendering the latter simpler and clearer and due to the fact that, as mentioned, they are per se known from the previously mentioned prior art document. FIG. 4 also shows the part of the plant 1 immediately to the left of the station V2 (with reference to the drawing) which comprises—at the upper level—a station DX, which shall be described hereinafter, where the separation of the body exiting from the plant is carried out by the respective pallet, while at the lower level it is provided with a waiting station 20.

Figure 5:
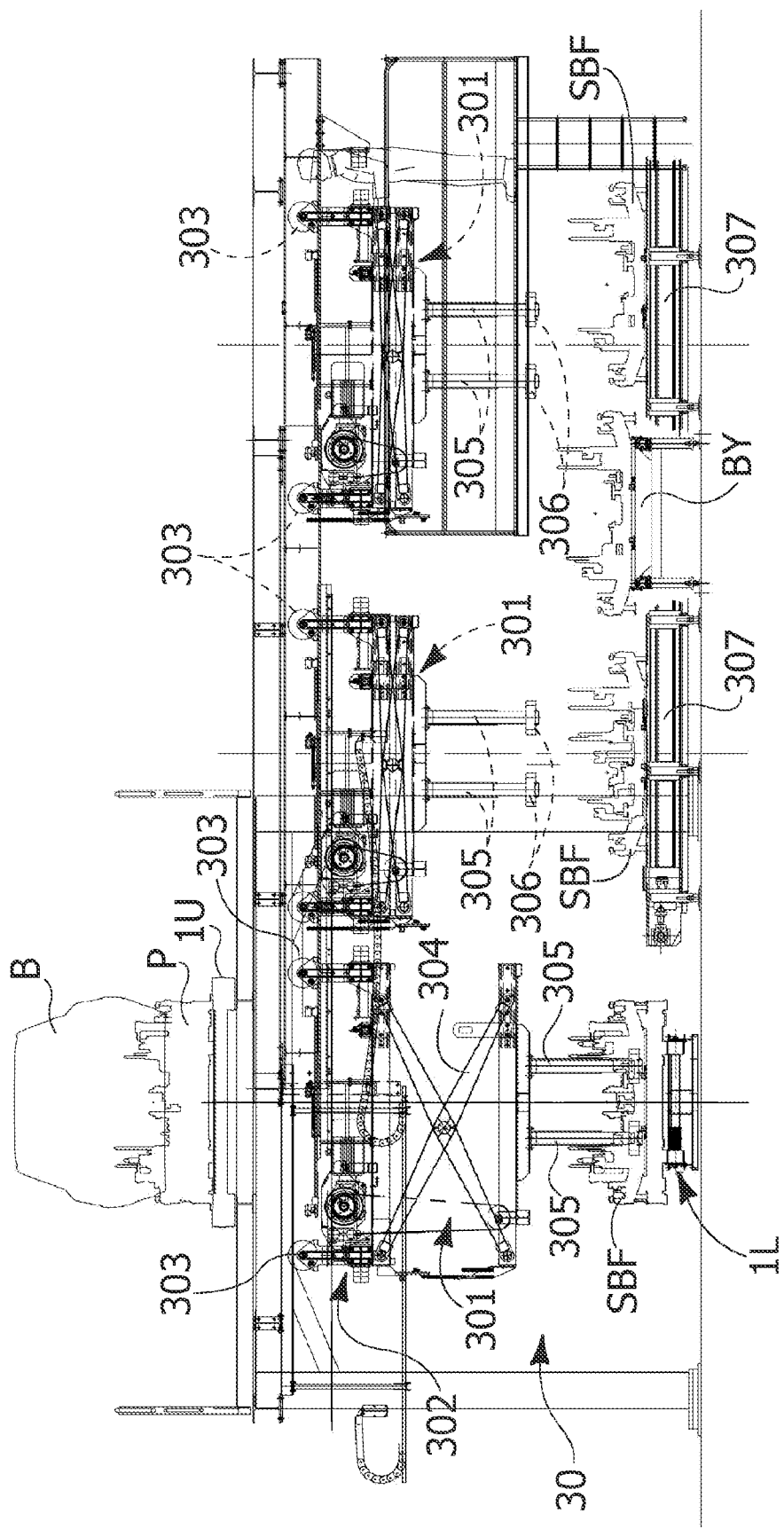
FIG. 5 is an elevational view in a transverse plane with respect to the longitudinal direction of the line showing a station at the beginning of the lower section of the line, where a front sub-pallet can be unloaded from a respective pallet moving along the line.

FIG. 5 is an enlarged scale view, according to a section transverse to the longitudinal direction of the line, of the station indicated with 30 in FIG. 1. The station 30 is provided at the beginning of the lower section 1L of the line with the aim of loading the front sub-pallet SBF by a respective base element P1 of a pallet. A pick-up device 301 (illustrated in FIG. 5 in the various operative positions thereof) which is associated to an overhead conveyor 302 mounted above the station 30, below the floor of the overlying upper section 1U of the line is provided in the station 30 for such purpose. The overhead conveyor 302 provides for a carriage with wheels 303 movable on elevated tracks extending transversely with respect to the longitudinal direction of the line. The pick-up device 301 comprises an X-shaped pantograph 304 bearing—on the lower side thereof—vertical arms 305 provided—at the lower ends thereof—with coupling components 306 of any known type adapted to couple and/or grip a front sub-pallet SBF. The construction details related to the overhead conveyor 302 are not illustrated herein in that they may be obtained in any known manner. Same case applies to the lifting device 304 and the control means associated thereto. Through said overhead conveyor, the pick-up device 301 can be moved transversely with respect to the line and positioned both at a position overlying the lower section 1L of the line (the extreme left position in FIG. 5), at which it can pick-up an empty sub-pallet SBF and a position located beside the line (at the centre in FIG. 5), in which the lifting device 304 can lower the sub-pallet SBF above an end of a conveyor 307 (for example a roller conveyor) for collecting the empty sub-pallets (also see FIG. 2B). Lastly, the conveyor 301 can also be positioned at a maintenance position (the extreme right position in FIG. 5) where an operator—on an elevated platform (see FIG. 5)—performs the required operations.

FIG. 5 also illustrates a bypass conveyor BY which connects the conveyor 307 of the station 30 to the conveyor 407 (described hereinafter) of the subsequent station 40.

Figure 6:
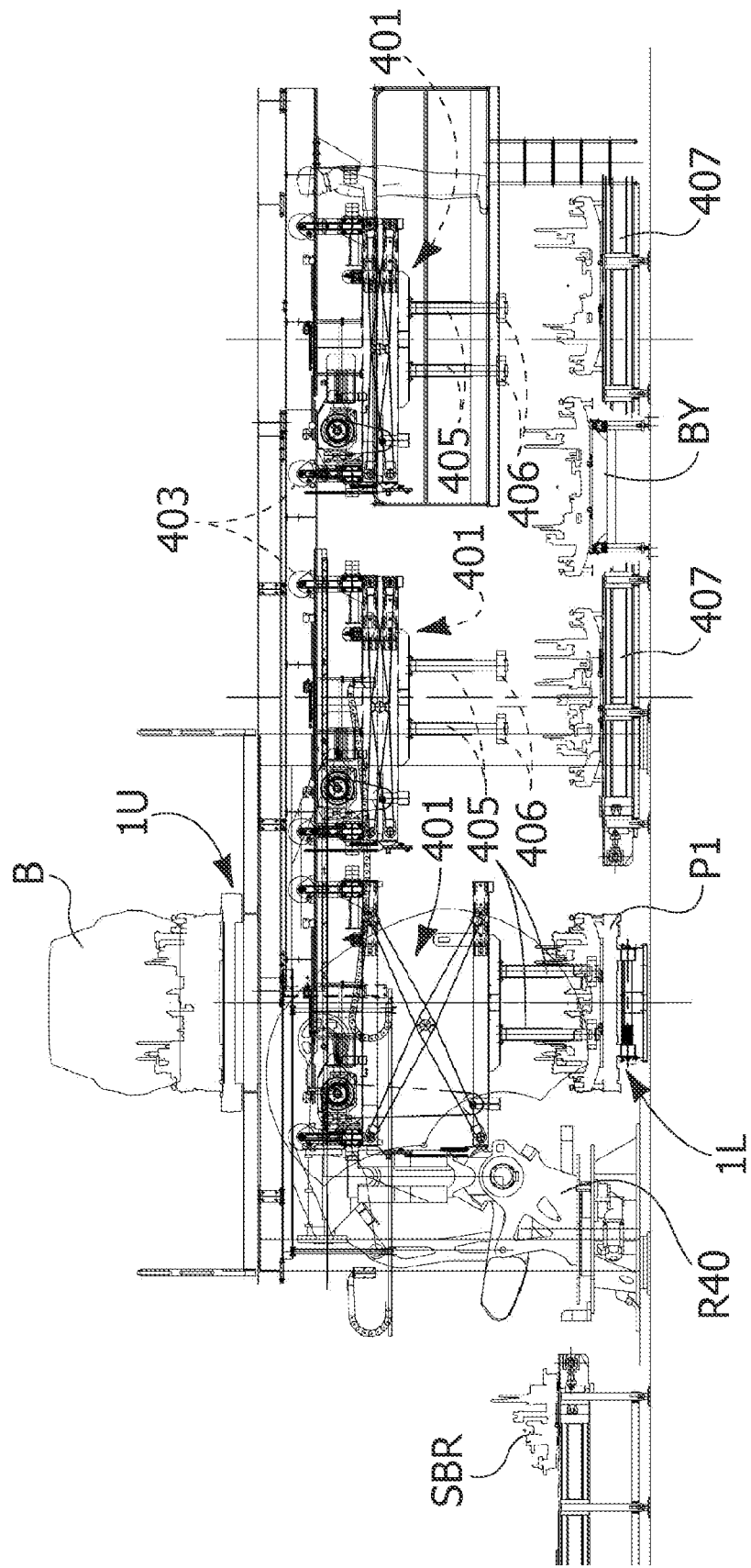
FIG. 6 is an elevational view, still in a transverse plane with respect to the longitudinal direction of the line, showing a subsequent station at which a respective pallet can be loaded or unloaded with a lower sub-pallet and loaded with a front sub-pallet.

FIG. 6 shows, in a transverse section with respect to the longitudinal direction of the line, the subsequent station 40 of the lower section 1L, where a pick-up device 401, entirely analogous to the one illustrated in FIG. 5 for the station 30 (illustrated in FIG. 6 in the various operative positions thereof), which loads—on the base element P1 of the pallet—a new front sub-pallet SBF full of mechanical components previously loaded thereon, is provided. The full sub-pallet SBF is picked up by a conveyor 407 (also see FIG. 2B) used for accumulating the full sub-pallets, and thus unloaded on the element P1.

In FIG. 6, the parts corresponding to those of FIG. 5 are indicated using the same reference number, except for the substitution of the initial number 3 with the initial number 4.

Also in this case, the overhead conveyor 402 is mounted below the floor of the overlying upper section 1U of the line.

The pick-up device 401 can be positioned above the line 1L (extreme left position in FIG. 6) for depositing—on the base element P1 of the pallet—a new front sub-pallet SBF full of mechanical components previously loaded thereon, or above an end of the conveyor 407 (central position in FIG. 6), or at a maintenance station, illustrated at the extreme right position in FIG. 6, where an operator—on an elevated platform—may perform the maintenance operations, in a manner analogous to that described above regarding the station 30.

Lastly, the station 40 also provides for the unloading of an empty rear sub-pallet SBR and the loading of a rear sub-pallet SBR full of mechanical components previously loaded thereon, both operations being performed by means of a manipulating robot R40 which transfers the rear sub-pallet SBR from the base element P1 of the pallet P which is located in the line to a conveyor 408 which is located beside the line or, vice versa, from the conveyor 408 to the base element P1 of the pallets which is located in the line.

Furthermore, it should also be observed that the pick-ups 301, 401 of the stations 30 and 40 can also be used as mutual back-ups, without affecting the cycle time. The bypass conveyor BY directly connecting the conveyors 307, 407 is primarily used for such purpose.

Moving along the lower section 1L of the line, a respective pallet P, after traversing the stations 30 and 40, is thus provided with the sub-pallets SBF, SBR and the respective mechanical parts (engine, front suspension and rear suspension). The line also allows manually loading other mechanical parts such as silencers, front radiators, and other components depending on the specific requirements of the manufacturer of the motor-vehicles.

Downstream of the station 40, the pallets P which move along the lower section of the line 1L pass through a passive station, left free to allow performing possible maintenance or back-up interventions and thus through the stations 60 and 70 (see FIGS. 1, 2B) which are located below the bolting station S provided at the upper level and which are occupied by the robots R intended to bolt the mechanical parts on the bodies which are located at the upper level.

Figure 7:
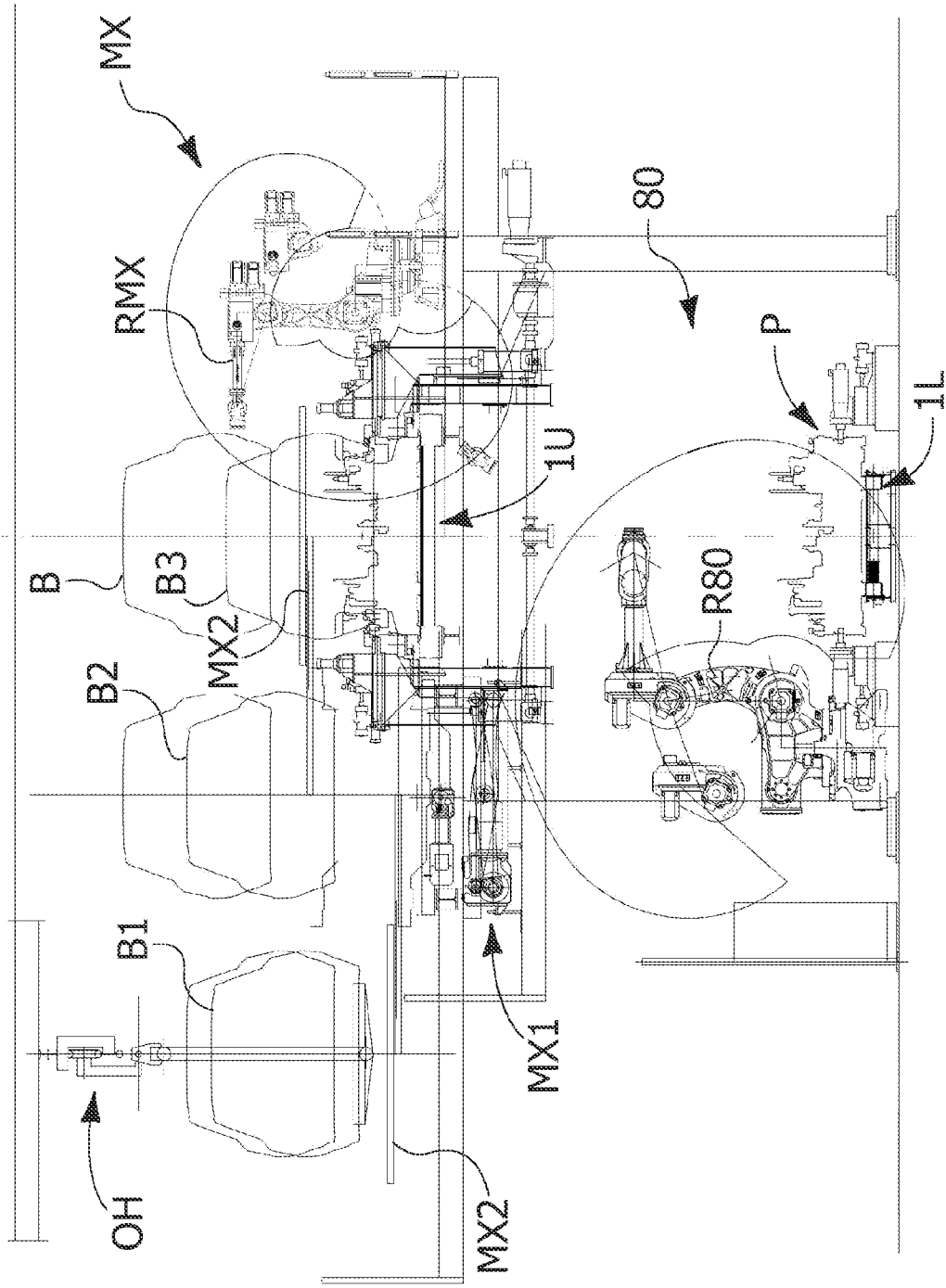
FIG. 7 is an elevational view in a transverse plane with respect to the longitudinal direction of the plant, showing—at the upper level—a station in which a body is loaded on a respective pallet and—at the lower level—a station in which robots, adapted to engage spring units of a front suspension carried by the pallets so as to bring them into a configuration adapted for the assembly on the respective body, are provided.

A station 80 at which one or more manipulating robots R80 (see FIGS. 1 and 7) can be used for further operations, for example providing components such as suspension springs in the proper assembling configuration is provided downstream of the stations 60, 70, along the lower section 1L of the line. FIG. 7 also shows the overlying station MX, which shall be illustrated hereinafter.

Figure 8:
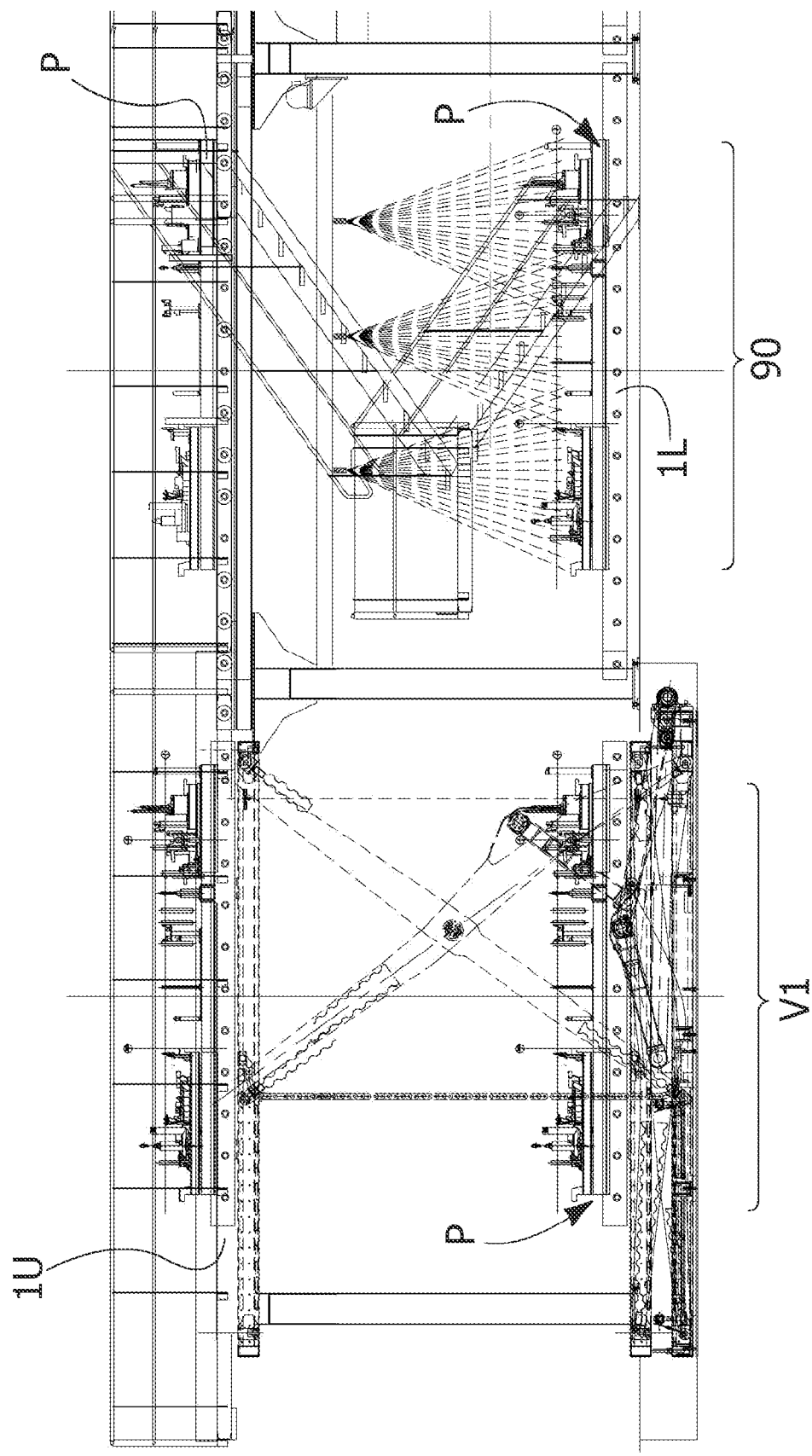
FIG. 8 is a side elevational view showing the vertical transfer station through which a respective pallet at the end of the lower section of the line is lifted up to the beginning of the upper section.

With reference to FIG. 8, downstream of the station 80, the lower section 1L of the line provides a station 90 which is a control station at which the control of the proper positioning of the mechanical parts to be assembled on the respective body and the configuration of some movable units mounted on the pallet to guarantee the adaptability of the pallet to different models, is carried out. Preferably, such control is carried out, according to the invention, by means of an automatic vision system sold under the "VERSAVISION" trademark by the Applicant, which includes a control system adapted to compare the image obtained from a camera with a reference image memorized in the system.

The vertical transfer station V1 using a transfer device entirely analogous to that used in the station V2 described previously, for transferring the pallet P with all the mechanical parts mounted thereon to the level of the upper section 1U of the line, is provided downstream of the station 90.

The pallet P with all the mechanical parts mounted thereon can thus be carried up to a station MX where a respective body is deposited thereon. For such purpose, the station MX is provided with a lifting device MX1 arranged beside the line and provided with forks MX2 movable transversely on one side or the other of lifting device. Through such forks, the lifting device can pick up a body B1 hooked on hook-like support device H of an overhead line OH and first transfer it above the lifting device MX1 to a position B2 and then, through a movement of the forks MX2, to the final position B3 above the pallet, where the body can be lowered on the pallets and on the mechanical parts carried thereby by lowering the lifting device MX1. During such final operation of associating the body to the mechanical parts, four robots RMX guide the shock absorbers and the suspension springs into the respective seats on the body (also see FIG. 2).

Figure 10:
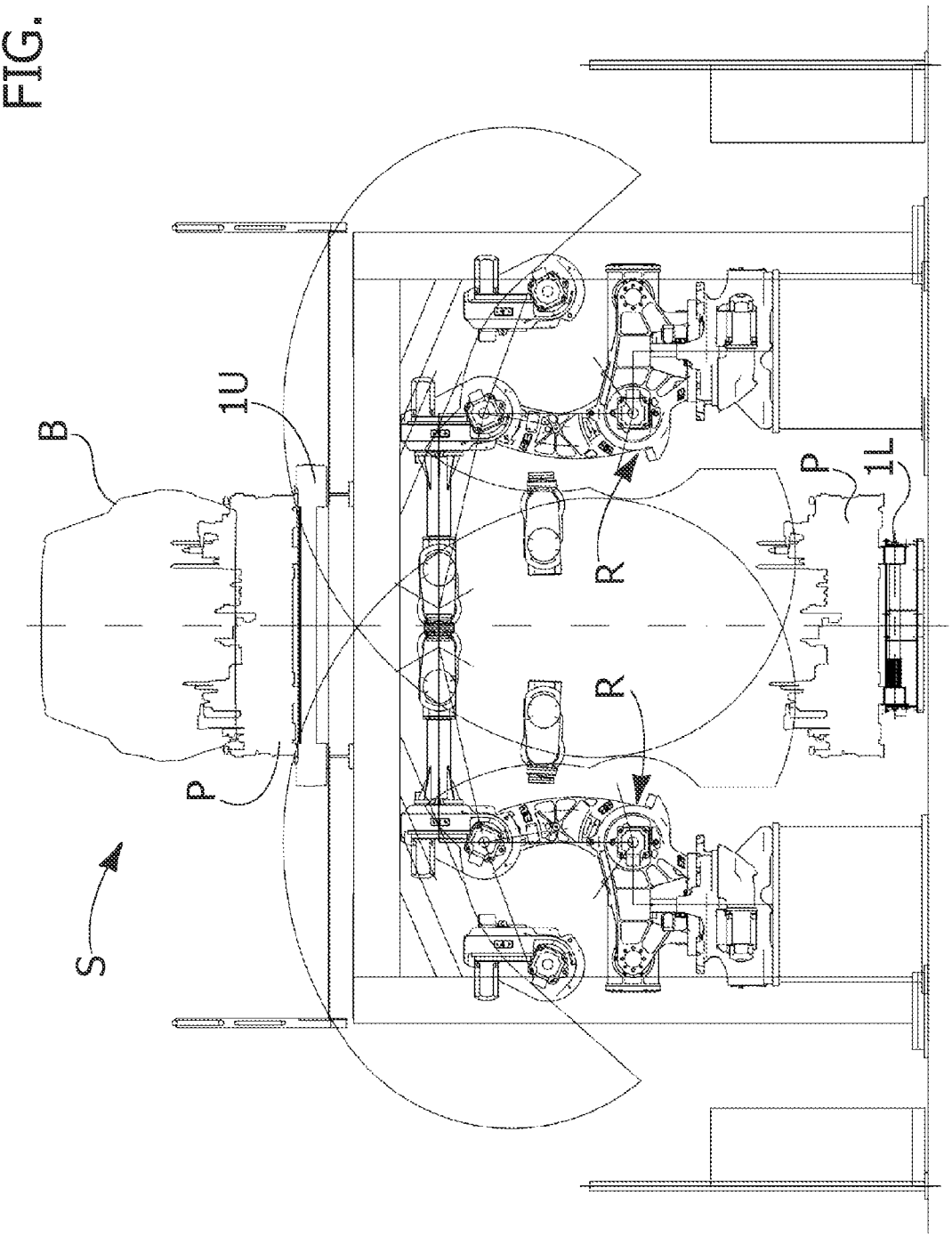
FIG. 10 is a view in a plane transverse to the longitudinal direction of the line showing the bolting station provided along the upper section of the line, at which the mechanical parts provided on the pallet are bolted to the respective body through an intervention—from the bottom—of bolting devices provided at the lower plane of the plant, which in the illustrated example are carried by robots.

FIG. 10 is a cross-section illustrating the bolting station S at which the robot bolting devices R provided at the lower plane engage—from beneath—the lower ends of the transmission shafts freely rotatable on the pallet P which is located at the upper plane, so as to rotate the screws associated to the upper end of such shafts and thus fix the various mechanical parts mounted on the pallet to the body B which is located in the bolting station S.

Figure 11:
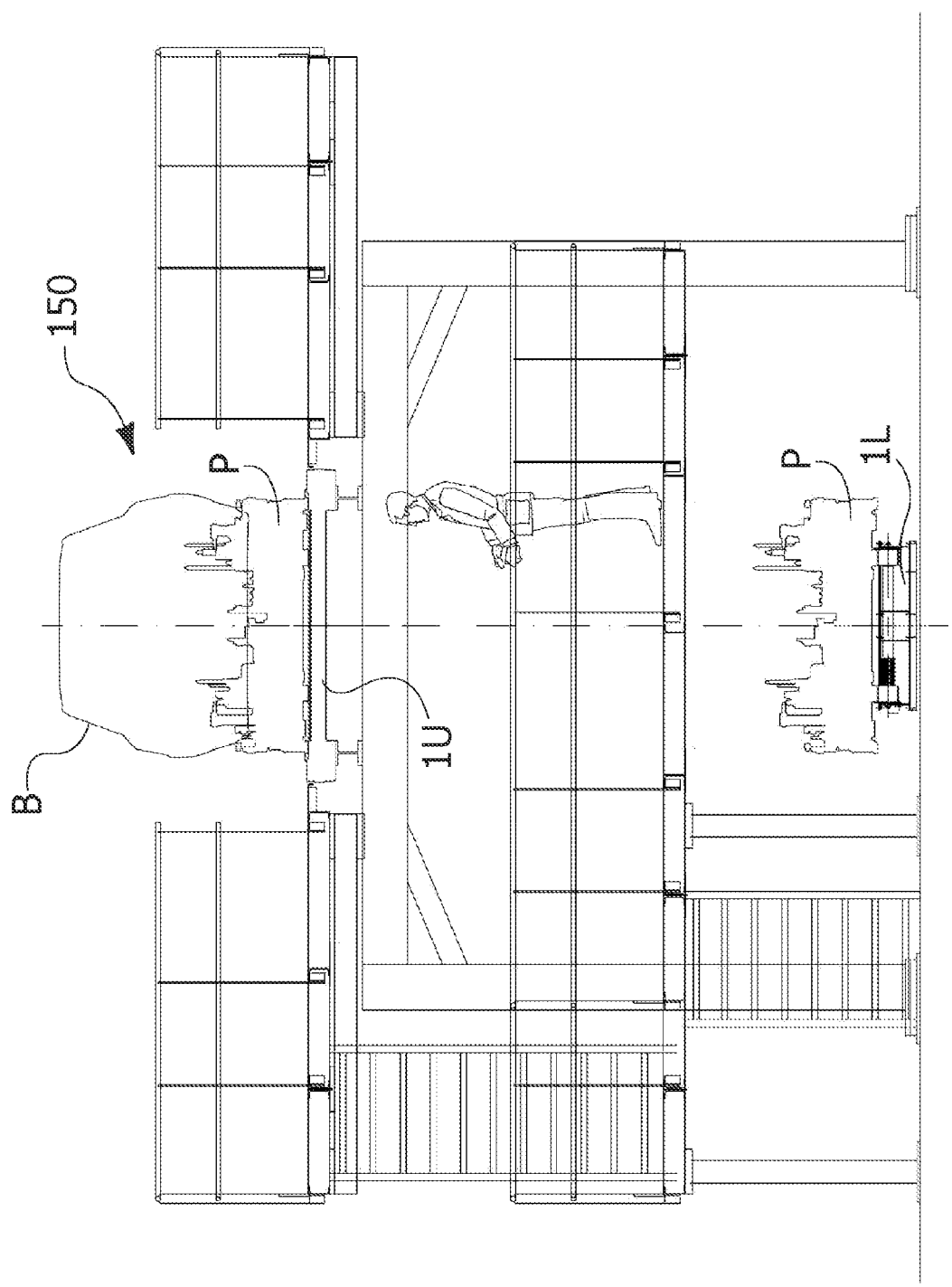
FIG. 11 is a further cross-sectional view, showing a back-up station where an operator can intervene manually when required to complete the bolting of one or more parts regarding which an improper bolting of the respective screws has been signaled.

FIG. 11 is a cross-section illustrating a subsequent station 150 (also see FIG. 1) at which one or more operators can intervene manually to repeat and/or complete the bolting of one or more parts regarding which an improper bolting by the robot R in the station S has been signaled.

Figure 12:
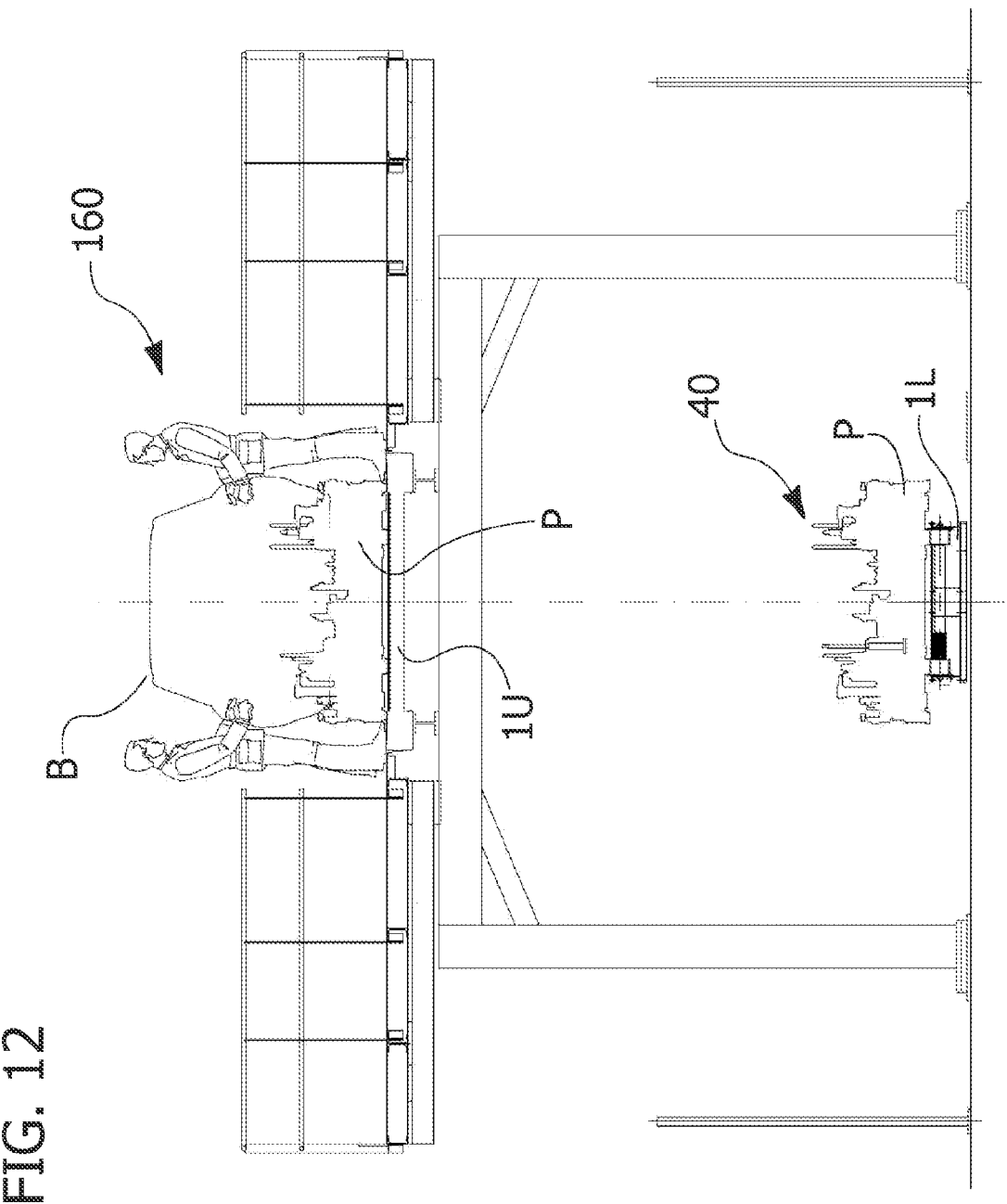
FIG. 12 is a cross-sectional view showing a subsequent station located along the upper section of the line in which operators can manually bolt some mechanical parts which require an intervention from above.

FIG. 12 is a cross-section of a further station 160 at which operators W manually perform bolting operations which require a further intervention from above, to complete the assembly of the mechanical parts.

Figure 9:
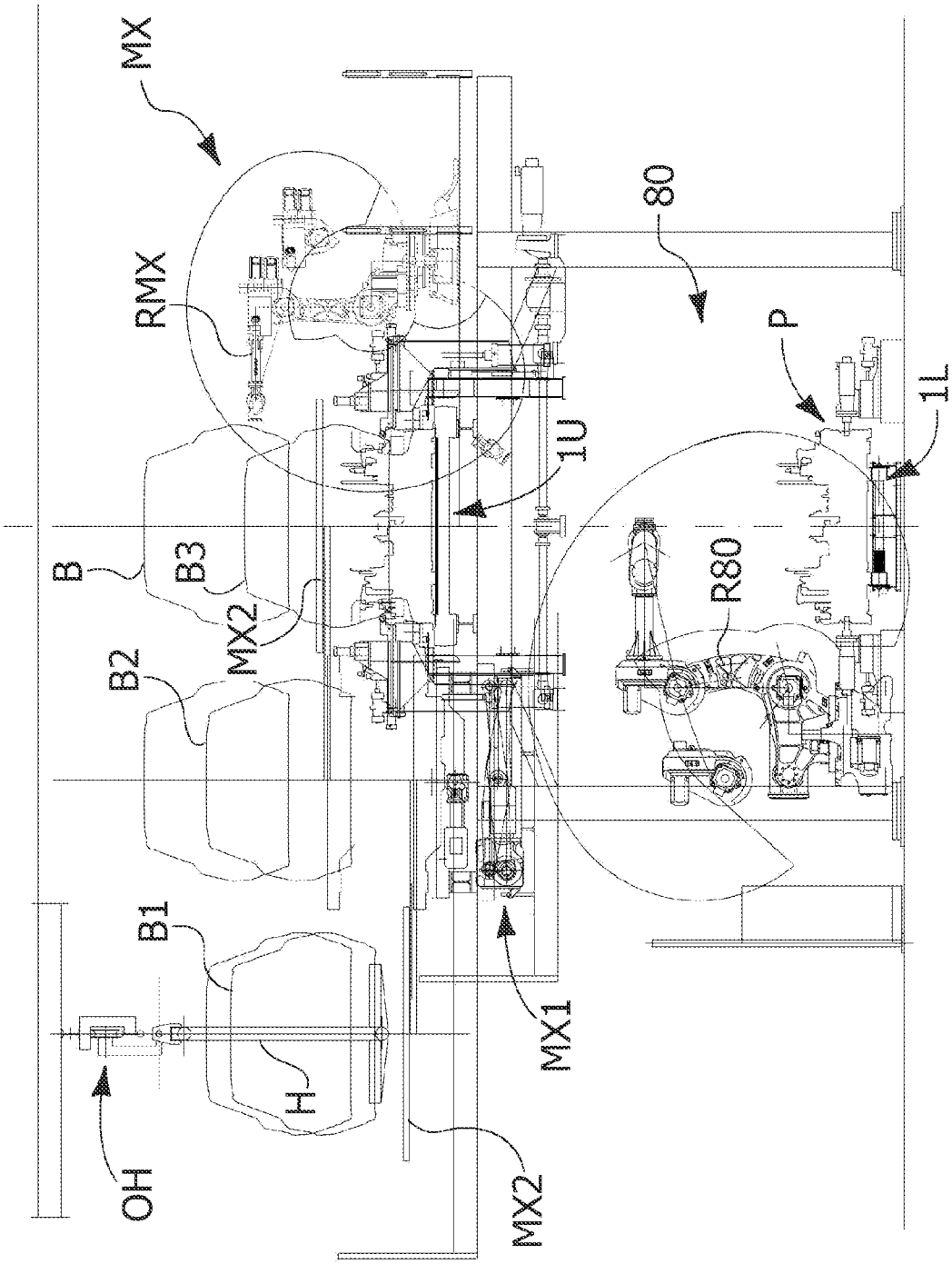
FIG. 9 shows—in a transverse plane with respect to the longitudinal direction of the line—the station along the upper section of the line at which the bodies are loaded onto the pallets which move along the line.
Figure 13:
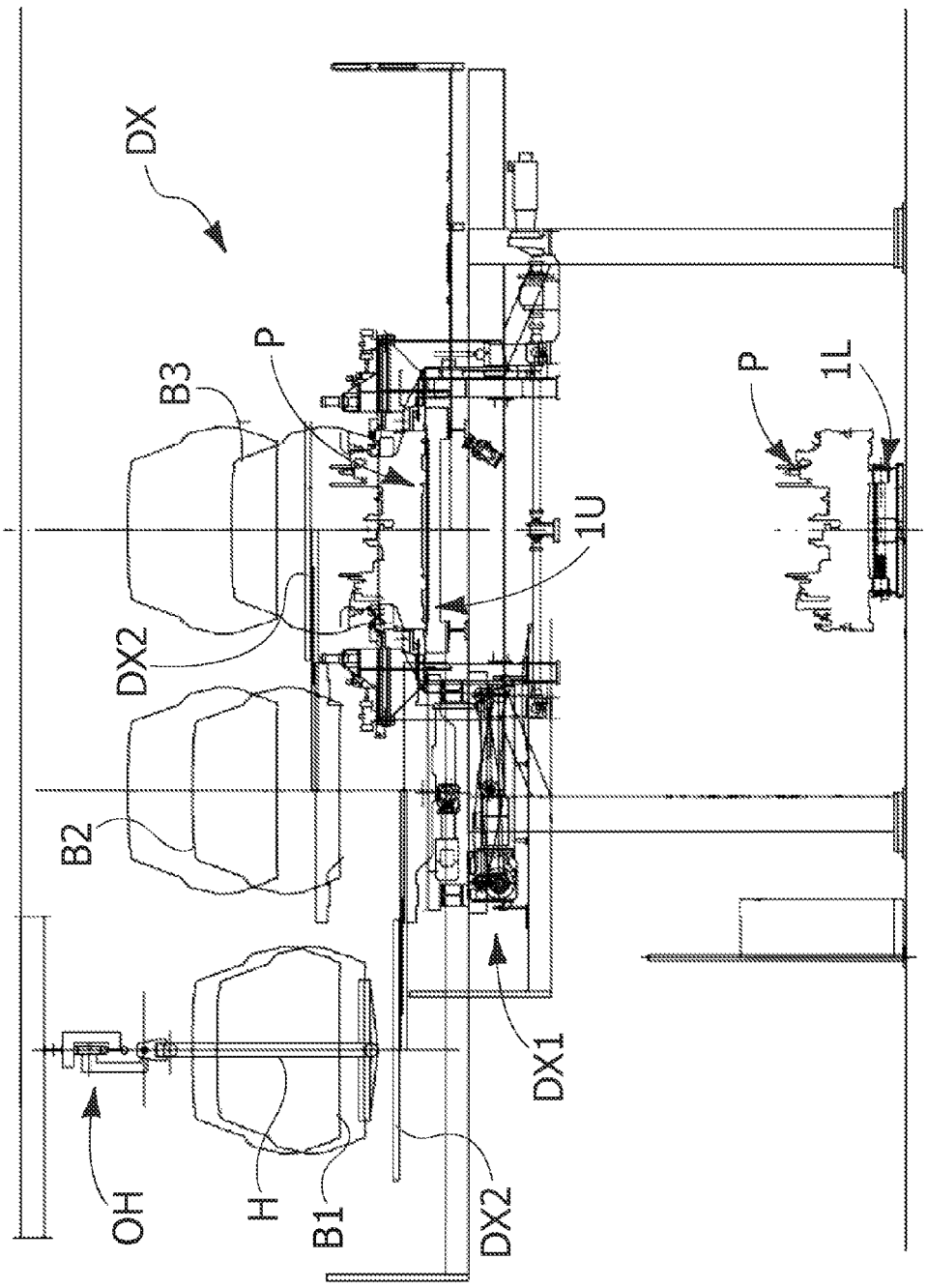
FIG. 13 is a cross-sectional view showing—at the upper level—the station in which the separation between the already completed body with the parts bolted thereon from the respective pallet, which thus remains empty and free to be taken back to the beginning of the lower section of the line, is carried out.

FIG. 13 is an enlarged scale cross-sectional view of the "divorce" station DX at which the body with the mechanical parts bolted thereon is separated from the respective pallets P. This is obtained by means of a fork lifting device DX1 entirely analogous to the lifting device MX1 provided in the "marriage" station MX. Thus, in FIG. 13, the parts corresponding to those of FIG. 9 are indicated using the same reference numbers, except for the substitution of letter M with letter D. Thus, the body the body can be carried from the position B3 above the line to an intermediate position B2 through the forks DX2 and then from such intermediate position B2 to a position B1 above a hook-like support device H carried by an overhead conveying line OH, which moves the body with the mechanical parts bolted thereon out of the plant, for the subsequent assembly operations.

Figure 14:
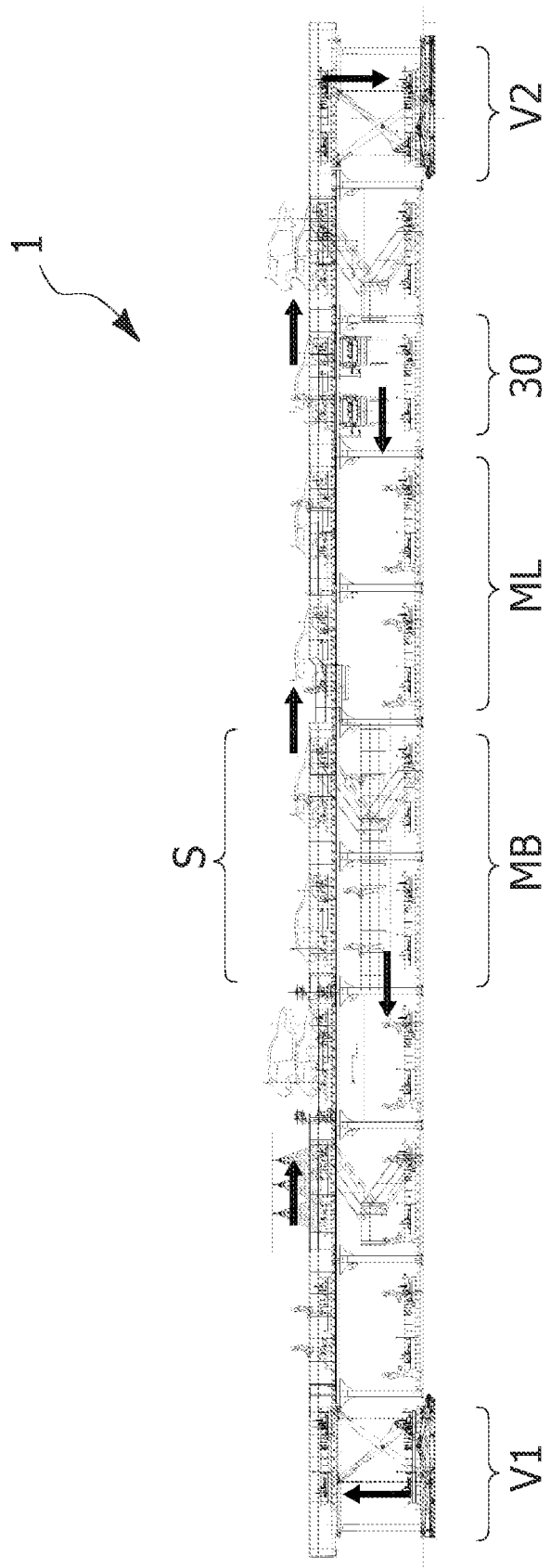
FIG. 14 is a variant of FIG. 1 showing a version of the plant where the bolting devices used in the bolting station are actuated manually by the operators.

The general architecture of the plant according to the invention is entirely flexible, given that one or more sections of the line which provide robots with sections where manual interventions by the operators are provided for, can be replaced. An example of this type is illustrated in FIG. 14 where the plant includes a line section ML where the various mechanical parts are loaded manually on the pallets which move along the lower section of the line, and a section MB where the operation of bolting the mechanical parts on the bodies which move along the upper section of the line is carried out manually.

As clear from the description above, the plant according to the invention attains a considerable improvement with respect to the previous solution proposed by the Applicant (GB2136330A) in terms of reducing the occupied space, greater operative efficiency due to the reduction of the "passive" parts of the lines, flexibility due to the modular architecture of each pallet as well as the modular architecture of the entire line and easy accessibility of each station of the line from both sides thereof, to the advantage of logistics regarding the supply of the parts. Besides the previously mentioned advantage of considerably reducing the occupied space, the provision of the line for assembling the mechanical parts on the pallet and the bolting line at a position superimposed over each other allows a more rational use of different assembly stations. Furthermore, excavation of pits into the floor to receive the means required for bolting is not necessary.

As already illustrated above, though the plant according to the invention is suitable for using devices of any known type regarding the means for moving the pallets within the plant, the motorized roller conveyor line which represents a production standard of the Applicant company, with control and position systems sold under the "VERSADRIVE" and "VERSACODER" trademarks, and with the further provision of a control of the proper execution of the assembly operations through the automatic vision system sold by the Applicant under the "VERSAVISION" trademark is particularly preferred.

Obviously, without prejudice to the principle of the invention, the construction details and the embodiments may widely vary with respect to what has been described and illustrated, by way of non-limiting example, without departing from the scope of protection of the present invention.

What is claimed is:

1. An assembly plant for use in assembling mechanical parts on motor-vehicle bodies, comprising:
    an endless pallet conveyor line having:
        a plurality of pallets supporting vehicle mechanical parts to be bolted to the vehicle body selectively movable along a first lower vehicle mechanical parts-conveying line section having a starting end and a final end;
        the vehicle mechanical parts supporting pallets selectively movable along a second upper vehicle mechanical parts-connection line section having a starting end and a final end, the second upper line superimposed and spaced apart above said first line section, said first line section being aligned with said second line section; and
        a first and a second vertical transfer station connecting said first lower line section to said second upper line section at the respective opposite starting and final ends thereof forming a closed loop conveyor line arranged in a vertical plane;
    the plurality of vehicle mechanical parts supporting pallets each movable in said closed loop conveyor line wherein each pallet proceeds along said first lower line from the starting end to the final end in a first direction, said pallets being then transferred from the final end of said first lower line section to the starting end of said second upper line section at the first transfer station, said pallets then proceeding along said second upper line section in a second direction opposite the first direction until reaching the final end of said second upper line section, where they are moved again to the starting end of the first lower line section by the second transfer station;
    means provided along said first lower line section for loading the mechanical parts of motor-vehicles on said pallets while said pallets are proceeding along said first lower line section, each pallet adapted to receive the mechanical parts of a respective motor-vehicle;
    means for loading a respective motor-vehicle body on each pallet at a loading station located in proximity of said second upper line starting end, so that said motor-vehicle body is coupled with the mechanical parts which have been loaded on the pallet along the first lower line section;
    at least one bolting station positioned along said second upper line wherein said mechanical parts are bolted from below to said motor-vehicle body;
    a pair of programmable manipulating robots each for bolting said mechanical parts to said motor-vehicle body at said bolting station of said second upper line, said pair of robots being arranged on each opposing side of and transverse to said first lower line section to accommodate the passing of said pallets between the pair of robots while said pallets are proceeding along said first lower line section; and
    means for unloading the respective body with the connected mechanical parts in proximity of the final end of said second upper line section.

2. The plant according to claim 1, wherein each pallet is provided with locating means for positioning thereon the mechanical parts to be bolted to the respective vehicle body, the locating means being adaptable to different types of motor-vehicles.

3. The plant according to claim 2, wherein at least part of the locating means for positioning the mechanical parts are carried by one or more sub-pallets.

4. The plant according to claim 3, wherein each pallet is provided with a front sub-pallet and a rear sub-pallet.

5. The plant according to claim 1, wherein the pallets further comprise vertical transmission shafts freely rotatable on the respective pallet and passing through the pallet, each of the shafts having a lower end engageable by the pair of robots and an upper end bearing a screw for bolting a respective mechanical part to the respective vehicle body.

6. The plant according to claim 4, wherein the lower line section includes one or more station for at least one of loading or unloading the sub-pallets on a base element of the pallet.

7. The plant according to claim 6, wherein the one or more station for at least one of loading or unloading the sub-pallets are provided with means for supplying the sub-pallets to the line, in which the sub-pallets are preliminarily loaded off-line with mechanical parts supported thereon.

8. The plant according to claim 1, wherein at the loading station, in which a respective vehicle body is associated to a respective pallet with the mechanical parts mounted thereon, there are arranged manipulating robots for holding some mechanical parts in a proper position for assembling on the body.

9. A vehicular assembly line for use in progressively mounting vehicle mechanical components positioned on a moving pallet to a vehicle body, the assembly line comprising:
    an endless conveyor for progressively moving a plurality of vehicle mechanical parts supporting pallets along an assembly path of travel;
    the assembly path of travel having a first lower level for supporting and moving the vehicle mechanical components loaded on a pallet in a first direction and a second upper level for moving the pallets supporting the vehicle mechanical components in a second direction opposite the first direction and connecting the vehicle mechanical components to a vehicle body, the second upper level positioned in a vertical plane directly above the first lower level;
    a pair of vertical transfer devices for moving the pallets from the first lower level to the second upper level;
    a plurality of bolting stations positioned distant from one another along the second upper level assembly path of travel; and
    a plurality of bolting devices positioned vertically below a respective bolting station, the bolting devices selectively engageable with rotatable shafts connected to the pallets when positioned at a respective bolting station for securing at least one supported vehicle mechanical component on the pallet to the vehicle body for progressive connection of vehicle mechanical components to the vehicle body progressively moving along the second upper assembly path of travel, the bolting devices including at least one pair of bolting devices positioned on each opposing side of and transverse to the first lower level assembly path of travel beneath a respective second upper level bolting station to accommodate the passing of the pallets supporting the vehicle mechanical components between the pair of bolting devices while the pallets are proceeding along the first lower level assembly path of travel.

10. The assembly line of claim 9 wherein the at least one pair of bolting devices further comprise:
at least one pair of programmable robots; and
each robot having a base connected to an assembly plant floor and having a path of travel selectively into and out of the assembly path of travel and limited to below the second upper level assembly line, each robot selectively engageable with the respective rotatable shafts extending downward from the second upper level bolting stations as the pallets progressively move the vehicle mechanical components and vehicle body along the second upper level assembly path.

11. The assembly line of claim 10 wherein the robot base is elevated above the assembly plant floor to conserve use of assembly plant floor space.

12. The assembly line of claim 10 further comprising a separation station positioned downstream of a last bolting station along the second upper level assembly path, wherein the vehicle body with mounted vehicle components is removed from the pallet prior to the pallet moving on one of the vertical transfer stations from the second upper level to the first lower level.

13. An assembly plant for use in assembling mechanical parts on motor-vehicle bodies, comprising:
an endless pallet conveyor line having:
a plurality of pallets supporting vehicle mechanical parts to be bolted to the vehicle body selectively movable along a first lower vehicle mechanical parts-conveying line section having a starting end and a final end;
the vehicle mechanical parts supporting pallets selectively movable along a second upper vehicle mechanical parts-connection line section having a starting end and a final end, the second upper line superimposed and spaced apart above said first line section, said first line section being aligned with said second line section; and
a first and a second vertical transfer station connecting said first lower line section to said second upper line section at the respective opposite starting and final ends thereof forming a closed loop conveyor line arranged in a vertical plane;
the plurality of vehicle mechanical parts supporting pallets each movable in said closed loop conveyor line wherein each pallet proceeds along said first lower line from the starting end to the final end in a first direction, said pallets being then transferred from the final end of said first lower line section to the starting end of said second upper line section at the first transfer station, said pallets then proceeding along said second upper line section in a second direction opposite the first direction until reaching the final end of said second upper line section, where they are moved again to the starting end of the first lower line section by the second transfer station;
means provided along said first lower line section for loading the mechanical parts of motor-vehicles on said pallets while said pallets are proceeding along said first lower line section, each pallet adapted to receive the mechanical parts of a respective motor-vehicle;
means for loading a respective motor-vehicle body on each pallet at a loading station located in proximity of said second upper line starting end, so that said motor-vehicle body is coupled with the mechanical parts which have been loaded on the pallet along the first lower line section;
at least one bolting station positioned along said second upper line wherein said mechanical parts are bolted from below to said motor-vehicle body;
wherein said first line comprises a station located below said bolting station of said second line, at which a pair of programmable manipulating robots is arranged on each opposing side of and transverse to said first lower line section to accommodate the passing of said pallets between the pair of robots while said pallets are proceeding along said first lower line section, and operated for bolting said mechanical parts to said motor-vehicle body at said bolting station of said second line; and
means for unloading the respective body with the connected mechanical parts in proximity of the final end of said second upper line section.

14. The plant according to claim 13, wherein each pallet is provided with locating means for positioning thereon the mechanical parts to be bolted to the respective vehicle body, the locating means being adaptable to different types of motor-vehicles.

15. The plant according to claim 14, wherein at least part of the locating means for positioning the mechanical parts are carried by one or more sub-pallets.

16. The plant according to claim 15, wherein each pallet is provided with a front sub-pallet and a rear sub-pallet.

17. The plant according to claim 13, wherein the pallets further comprise vertical transmission shafts freely rotatable on the respective pallet and passing through the pallet, each of the shafts having a lower end engageable by the pair of robots and an upper end bearing a screw for bolting a respective mechanical part to the respective vehicle body.

18. The plant according to claim 16, wherein the lower line section includes one or more station for at least one of loading or unloading the sub-pallets on a base element of the pallet.

19. The plant according to claim 18, wherein the one or more station for at least one of loading or unloading the sub-pallets are provided with means for supplying the sub-pallets to the line, in which the sub-pallets are preliminarily loaded off-line with mechanical parts supported thereon.

20. The plant according to claim 13, wherein at the loading station, in which a respective vehicle body is associated to a respective pallet with the mechanical parts mounted thereon, there are arranged manipulating robots for holding some mechanical parts in a proper position for assembling on the body.

* * * * *